United States Patent
Faine et al.

(10) Patent No.: US 6,926,753 B2
(45) Date of Patent: Aug. 9, 2005

(54) NON-BIOCHEMICAL METHOD TO HEAP LEACH COPPER CONCENTRATES

(75) Inventors: Jaime Rauld Faine, Santiago (CL);
Freddy Aroca Alfaro, Santiago (CL);
Raul Montealegre Jullian, Santiago (CL); Abraham Backit Gutierrez, Santiago (CL)

(73) Assignee: Minera Michilla S.A., Santiago (CL)

( * ) Notice: Subject to any disclaimer, the term of this patent is extended or adjusted under 35 U.S.C. 154(b) by 0 days.

(21) Appl. No.: 10/715,914

(22) Filed: Nov. 18, 2003

(65) Prior Publication Data

US 2004/0144209 A1 Jul. 29, 2004

(30) Foreign Application Priority Data

Nov. 26, 2002 (CL) .......................................... 2694-2002

(51) Int. Cl.[7] .............................. C22B 3/08; C22B 3/10
(52) U.S. Cl. ........................................................ 75/712
(58) Field of Search .......................................... 75/712

(56) References Cited

U.S. PATENT DOCUMENTS

| | | |
|---|---|---|
| 5,186,915 A | 2/1993 | Polizzotti |
| 5,527,382 A | 6/1996 | Pincheira Alvarez et al. |
| 6,063,158 A | 5/2000 | Sharp et al. |
| 6,083,730 A | 7/2000 | Kohr |
| 6,280,501 B1 | 8/2001 | Ferron |
| 2003/0223927 A1 * | 12/2003 | Russell et al. ................. 423/1 |

FOREIGN PATENT DOCUMENTS

| | | |
|---|---|---|
| CL | 40891 | 11/2002 |
| GB | 1235802 | 6/1971 |

OTHER PUBLICATIONS

"Designing the Leach System for Cerro Negro ore;" Kaczmarek, A.F., et al.; Cobre International Conference; *Electrofining and Hydrometallurgy of Copper*; vol. 4, Oct. 10, 1999, pp. 437–452.

* cited by examiner

Primary Examiner—Melvyn Andrews
(74) Attorney, Agent, or Firm—D. Peter Hochberg; Sean Mellino; Katherine R. Vieyra

(57) ABSTRACT

A procedure to agglutinate ore concentrations, which can be of copper, on a gravel heap, to be leached on a non-flooded bed which comprises: artificially adhering the concentrate to the surface of a solid material base, which can be an artificial material, or a stony substance; the agglutinated material is stockpiled, forming a leaching pile; and is irrigated with a leaching solution containing at least Cl, Cu, and Fe ions.

17 Claims, 7 Drawing Sheets

NON-BIOCHEMICAL METHOD TO HEAP LEACH COPPER CONCENTRATES

BACKGROUND OF THE INVENTION

1. Field of the Invention

The present invention relates to a procedure to agglutinate copper concentrates in a gravel heap, to be later leached on a non-flooded bed, to which an agglutinating solution containing calcium chloride, and a second solution containing sulfate ion, are added.

2. Description of the Prior Art

The copper concentrate, usually obtained by flotation, can be currently processed in order to obtain metal copper, by using both pyrometallurgical and hydrometallurgical techniques. As indicated by its name, the pyrometallurgical techniques, by far the most common ones at present, correspond to processes using high temperatures such as roasting, smelting, conversion, and fire refining, to obtain metal copper. On the other hand, the hydrometallurgical techniques correspond to those processes using aqueous solutions for copper extraction. During the last decade, the interest in using hydrometallurgical processes to treat copper concentrates has significantly increased, as the environmentalist pressure has increased on the pyrometallurgical processes, which have a serious impact on the environment.

A number of processes, most of them patented, have been studied for hydrometallurgical treatment of the copper concentrates, to avoid them to be processed by the usual pyrometallurgical techniques. From the industrial point of view and to this presentation's interest, all the processes for hydrometallurgical treatment of the copper concentrates, can be divided into two major fields: reactor leaching and heap leaching, being the first one where a high number of new proposed processes exist. In spite of the high number of processes developed in reactors, none of them has become an alternative to the pyrometallurgical process to treat the copper concentrates.

On the other side, unlike the treatment of copper concentrates in reactors, heap leaching has shown to be a very valuable technique to treat a great amount of copper ores. Copper ore leaching, both for oxidized ores and some sulphide ores, is currently one of the essential pillars sustaining this metal production worldwide.

The procedure as referred to by this invention, corresponds to the use of the heap leaching method, as applied to concentrate leaching rather than or in addition to, copper ores. At this point, it should be stressed that copper concentrates are mainly composed of sulphide copper species, with a much smaller component of oxidized species.

Next, a brief summary of the procedures as described in papers and patents for reactor copper concentrate leaching will be presented, as well as the attempts made to treat these concentrates in heaps, making use of its higher advantages, both practical and economical.

First, for reactor copper concentrate leaching, a series of chemical and biochemical reactions have been proposed, which are either oxidizing or oxidation reaction catalysis, able to dissolve the sulphide species containing copper. Among these are, mainly: oxidation by means of a ferric ion, or through the chlorine—copper ion, nitric oxides, gas chlorine, gas oxygen, and ferrooxidans bacteria.

Apart from the bacterial leaching processes, which are those closest to an industrial application, the following processes are currently under development, even though none of them shows the progress required for a high tonnage industrial application: pressure leaching, hot leaching, nitro-catalyst leaching, and bromide-chloride leaching. All these processes require the concentrate to be finely divided.

Of all of them, those of interest to this discussion are the processes using the ferric ion, and the copper ion, in a chloride environment, because use of the chloride ion is the basis of the present invention.

The use of chloride to help dissolve the copper concentrates has been studied, and patents have been generated for over 100 years. Leaching sulfides by using chlorides such as $FeCl_3$ and $CuCl_2$, is currently recognized as one of the most effective methods to produce concentrated solutions, from which copper is directly extracted, with the additional advantage of obtaining sulfur as an elementary substance.

Among the known and patented processes using reactors to leach the concentrates, are the following:

The Canmet process, Minemet Recherche and Broken Hill process use sulfate-chloride solutions. The solutions obtained are treated by solvent extraction in the traditional manner.

The Cymet process uses a $FeCl_3$ and $CuCl_2$ mixture as leaching media. The CuCl obtained is precipitated from the solution and reduced to metallic Cu by using a hydrogen flow in a fluidized bed reactor.

In Duval Corporation's Clear process, copper chloride is used as leaching means, along with brine containing potassium and sodium. Iron is precipitated in a second pressurized stage as potassium jarosite. Copper is electrolyzed in cuprous state to obtain copper crystals into the cathode. Copper chloride is regenerated from the cuprous in the anode, and returned to leaching.

The USBM process is similar except for the use of ferric chloride rather than copper chloride, and copper is dissolved as cuprous chloride. Copper is directly produced by electrolysis, in a diaphragm cell. Reagent is regenerated in the cell anodic compartment.

The Dextec process produces the anodic copper to dissolve in the presence of oxidizers. This reaction takes place in a diaphragm cell. The Cu sponge obtained as deposit in the cathode compartment contains all the impurities of the starting material.

The Elkem process is used to leach complex Cu, Zn and Pb concentrates in a countercurrent ferric and copper chloride solution. Cu is recovered, as a sponge, by EW. In a variation of this process, a $CuCl_2$ is produced, from which copper is separated by SX before the EW stage, in which the quality of the copper produced is improved. In this process, the Zinc is extracted from the leaching solution by using tributilphosphate. The Pb is precipitated as $PbCl_2$. The process is quite complicated, as problems exist related to the SX circuit and the shape of the metal obtained is not suitable for direct sales without an additional treatment.

The Cuprex process uses a NaCl and $FeCl_3$, based solution to dissolve the copper sulfides, obtaining a $CuCl_2$ solution. The Cu is extracted by using SX in chloride media, in three countercurrent stages. Re-extraction is carried out by using pure water and producing a concentrated $CuCl_2$ solution, which is transferred to a diaphragm cell. The Cu produced is granular copper (the commercial cathode) and the operation is rather complex.

The Intec process carries out leaching by using an oxidizing chloride solution containing bromide chloride (Halex). Once the solution has been purified by using lime, granular Cu is extracted by electrolysis in an ion-selective membrane cell. The Cu as produced, even though of good chemical quality, cannot be commercialized without an additional treatment.

All these processes use vessels or reactors, generally agitated, and at a relatively high temperature, to obtain the oxidizing and dissolving reactions of the copper sulfides. The reactors agitated have several disadvantages, which generally make the process to be non-feasible. First, most of the sulfides are resistant to leaching, or difficult to leach, so they require very long reaction times and, consequently, equipment is very big and expensive. Second, a high power supply is required to maintain the solids suspended and mixed. Also, leaching in agitated tanks is carried out in aggressive environments by using concentrated reagents, and often at very high temperatures. This makes the reactor to be very sophisticated and expensive.

On the other hand, and compared to the reactor treatment, there exists the heap leaching treatment to process sulphide ores. This procedure is clearly simpler and cheaper than that of the reactors, since it does not require sophisticated equipment, or high temperatures, or pressures higher than the atmospheric one. The time frames involved, however, are longer than those involved in reactors. In spite of this, the investment required is much smaller, since in this case the reactor is the heap itself, the forming of which is much cheaper than that of a reactor.

Disregarding the fact that heap leaching is widely used in the industry, both for treating oxidized ores and some sulphide ores, the stockpile concentrate leaching is just in its experimental stage.

This, because a pile of pure concentrate, in itself, can not form a stable heap without a previous treatment. When you try to do this, a number of problems related to the flow of the irrigating solution arises, such as canalization, water stagnation, and poor drainage, all this due to the small size of the particles of which it is composed. For this reason, alternate ways to maintain a concentrate heap that is structurally stable have been studied.

Various attempts to agglomerate the concentrate particles to each other through the well known pelletizing process, by using water with or without an agglomerating agent, are known. Initially, these pellets can be effectively located to form a stockpile. However, since most of the mineral compounds forming the pellet react to leaching, these quickly loss their consistence and, eventually, the stockpile collapses.

An alternate procedure partially solving, or at least diminishing the disadvantages already mentioned, consists of having the concentrate particles adhered to a base material. This latter can be an artificial material, or a stony material, such as ore, discarded ore or rock, barren material, gravel, etc., crushed to the appropriate size.

Some processes using this concept have been recently developed. For example, U.S. Pat. No. 6,063,158 by Sharp et al. year 2000, uses a polyethylene sphere packing called "Bioballs", which have the advantage of having a large external surface to which the concentrate particles can adhere. In this patent, the concentrate is mixed with graphite and a bacterial nutrient before adhering to the sphere packing, then the set is loaded on a heap and subjected to bacterial leaching, the same as if it was a mineral stockpile. In this case, a polyethylene-metacrilate polymer is used as a binding agent.

On the other hand, U.S. Pat. No. 6,083,730 by Kohr, year 2000, uses a similar concept to treat sulfide concentrates, but instead of using an artificial substratum as that in the paragraph above, it uses a set of coarse particles, which may correspond to washing, gravel, or other rock. Once the concentrate particles have adhered to the particles forming the coarse substratum, a stockpile is built and the concentrate bioleaching takes place. Here, the author mentions the possibility of adding an adherent polymer, even though he ensures that this is not necessary when the concentrate is wet, as a slurry. This same author has a number of patents in the USA, covering this subject, however, they refer to gold ore or copper concentrate bacterial leaching, and in no case to chemical leaching.

The idea of using an artificial or natural packing to obtain various hydrometallurgical reactions is not new. It began as a way to provide a base for bacterial growth through the formation of a biofilm, which has been proven even at an industrial level.

Unlike all the above, the invention described below refers to a new process to adhere the concentrates to the coarse particles, followed by a non-bacterial process based only in chemical reactions, the purpose of which is treating any copper concentrates by hydrometallurgical processing, as described below.

SUMMARY OF THE INVENTION

This invention refers to an exclusively chemical method, that is, non-biochemical, and also in a chloride environment, to heap leach copper concentrates by taking advantage of the fact that these concentrates can be artificially adhered to the surface of a mineral, barren material, discarded ore, gravel, leach gravel or other solid material of similar characteristics working as a base, commonly called: "gravel".

According to this invention, the concentrates are, in first place, added to the solids base into a standard mixing equipment, such an agglomeration drum or pelletizing disk, by making use of a reagent working as a binder or adhesive, whose active principle is, essentially, the hydrated calcium sulfate or gypsum, obtained "in situ" from the calcium chloride reaction along with sulfuric acid.

The main characteristic of the mixture obtained with the concentrate plus the mineral, gravel or other material, as described above, plus the calcium chloride in aqueous solution and the addition of sulfuric acid, consists in that the concentrate particles strongly adhere to the surface of the mineral because the formation of gypsum, which is a natural adhesive material formed by the reaction of the calcium chloride with the sulfuric acid, is added. The main advantage of the formation of such aggregate is that the heterogeneous mixture has such physical characteristics that can be piled up forming a heap, typical of those commonly used at the current hydrometallurgical plants. The concentrate is thus incorporated to the stockpile, and it benefits from all the advantages of this technique in terms of economy and simplicity.

Once this heap has been formed, the next step consists in irrigating it with a chloride, iron, copper and other ions concentrated leaching solution, as well as some residual sulfate from the sulfuric acid added. The highest valence of copper and iron chlorides (that is, +2 and +3, respectively) act as oxidizers of the copper sulphide ores, dissolving them and transferring them to the irrigation solution as lowest valence of said chlorides (that is, +1 and +2, respectively) like reaction products. Once the leaching solution, containing the copper values, has left the pile, the copper content is partially extracted through the traditional solvent extraction process and the solution already treated in this stage, still containing a significant proportion of the copper extracted, is recycled to the heap in order to continue leaching more copper sulphide species.

Copper that has been extracted in the solvent extraction stage is reextracted and electrowon or crystallized by means of procedures that are currently widely known, to obtain high purity copper cathodes, or the less interesting copper salts.

This process can be also applied to any materials with physical characteristics' similar to those of the concentrates, that is, finely divided, containing copper, such as precipitates or tailings of this metal

DETAILED DESCRIPTION OF THE INVENTION

Figure 1:
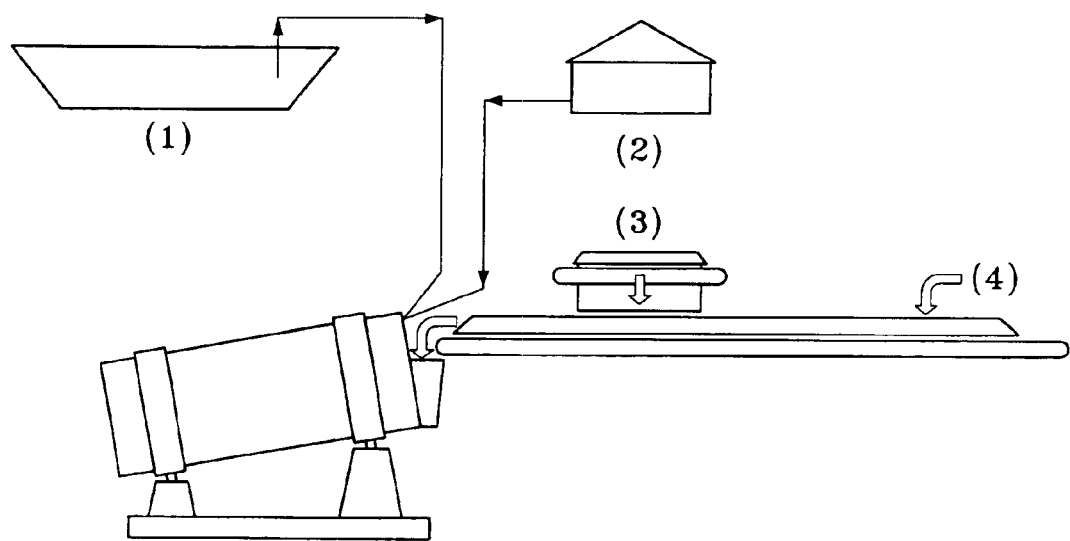
FIG. 1 shows the preferred way of adding a concentrate or other fine material to the main flow of an ore, or a different stony material. In this figure, the concentrate is added to the main flow of ore by means of a belt, perpendicular to the flow of mineral going to the agglomeration drum. Later, the heaps are irrigated in the standard way, and the solution recovered is subjected to a solvent extraction and electrowinning process.
Figure 2:
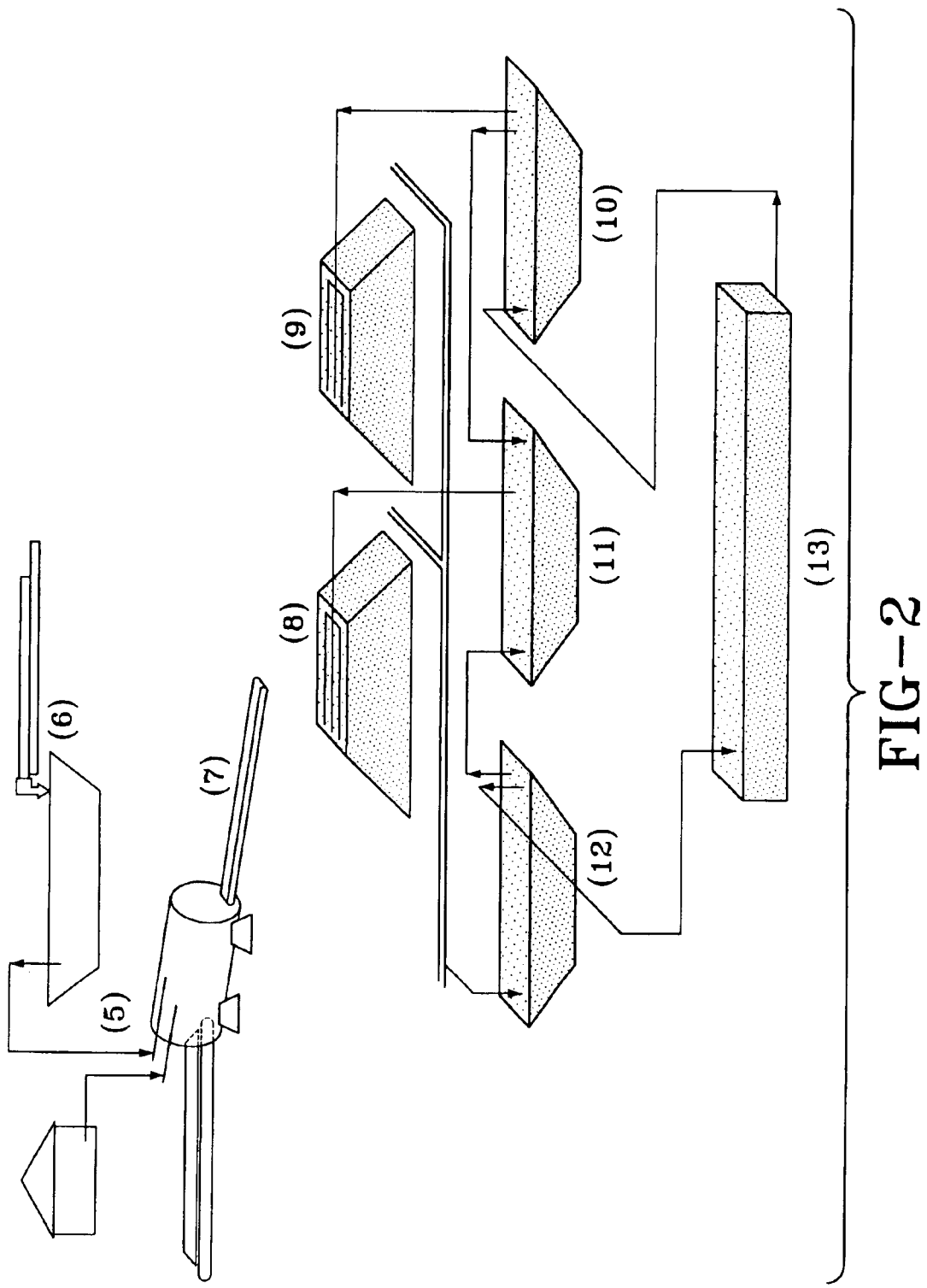
FIG. 2 is a flow diagram corresponding to the preferred realization of this invention.
Figure 3:
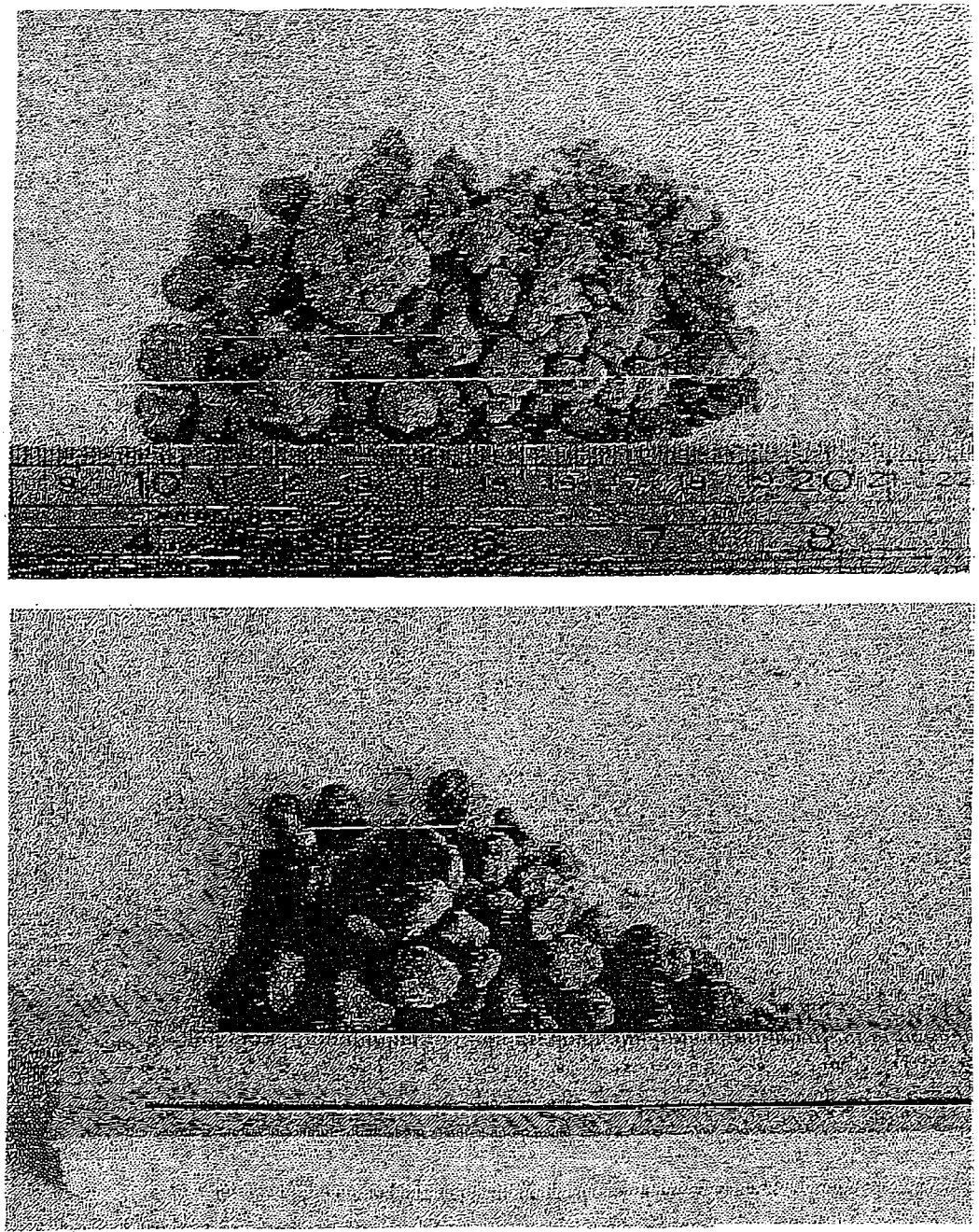
FIG. 3 shows the physical aspect of the material some time after the agglutination has occurred. The size of the agglutinated particles and the green color typical of the formation of copper oxychloride can be seen.

In summary, the industrial application process to treat copper concentrates through the procedure in this invention, consists in two consecutive and complementary stages. First, the copper concentrate adheres to the stony material base into an adequate equipment, hereunder designated "agglutination" to distinguish it from the process commonly called "agglomeration", which is the process where the particles of the same material adhere to each other. Next, the material formed is piled up at a pad, forming a leaching heap. As a second stage, once piled, the material is irrigated with a solution containing a high copper and chloride ion concentration, aimed at producing two effects: the oxidation of the ferrous ion to a ferric one, and the dissolution of the copper sulphides by means of the ferric ion thus formed. The solubilized copper is carried by the irrigating solution, and the solution flow obtained at the exit point of the piles is subjected to a copper recovery standard process, preferably a solvent extraction stage, followed by electrowinning to obtain copper cathodes.

Next, these two operations are described in detail.

In the current state of the art, carrying out a previous agglomeration and curing stage in a heap leaching process of finely crushed material, is a common practice. This concept is valid both for oxidized materials and copper sulphide ores. At this stage, two effects, highly important for the subsequent heap leaching process, are searched for. First, improving the physical characteristics of the ore particle set by means of an agglomeration process. In this process, the particles adhere to each other forming a uniform conglomerate of particles, to form a common body thanks to the adherence mechanisms resulting from the liquid bridges due to surface tensions. Currently, this operation is carried out in an agglomerating drum.

Specifically in this process, the finer particles adhere to the larger ones thanks to this mechanism, keeping the latter to be flushed away by the irrigation solution.

Second, obtaining a significant and quick dissolution of the copper oxidized species present on the ore, is searched for. This is achieved by adding acid, preferably sulfuric, and water, in this stage. The acid protons react with the oxidized anions of the ore species, generally oxygen, hydroxide, carbonate or silicate, forming water and releasing cations such as iron, aluminum, magnesium, and other less important ones, which are dissolved into the solution. This purely chemical concept is designated "curing" in the hydrometallurgical technical language.

For the first purpose of the agglomeration, that is, having the particles adhered to each other, adding water is generally enough, since this is able, by itself, to create an attraction force among the particles due to the generation of interface forces. In some cases, it has been necessary to add some binding or tensoactive agent to reinforce this effect, especially with ores showing a high content of fine particles. Generally, the binding agent active principle is based on organic polymers, such as the polyacrilamides, which are normally commercialized.

On the other hand, several attempts to use inorganic materials to have the ore particles adhered, are known. In the gold hydrometallurgy, for example, this role can be played, and they often do, by the Portland cement and the calcium oxide. For copper, where the adhesive materials, unlike the gold minerals, should be resistant to the acids, such attempts include the gypsum, calcium oxide, some clays, and others.

In the process, the purpose of this invention, the same concepts as described above are used. That is, having the concentrate particles adhered to the material working as a base, and quickly dissolving part of the copper contents of the ore, in this case, specifically the copper sulphides.

Both concepts are based on the results as previously described and presented in the Chilean Patent No. 40,891, which is incorporated by reference herein.

To have the concentrate particles adhered to the mineral material, the same concept used for ores, specially those containing fine particles, is used, except that in this case, an agglomerating element, formed at the same place, or "in situ", by chemical reaction of an specially added compound, is used: the calcium chloride, reacting with the sulfuric acid, which is usually added in this same instance.

The reaction as produced in this process is the following:

$$CaCl_2 + H_2SO_4 + 2H_2O \rightarrow CaSO_4 2H_2O + 2H^+ + 2Cl^- \quad (1)$$

Where the compound: $CaSO_4 2H_2O$ also commercially known as gypsum, is a natural, inorganic binding material, used in this manner in various processes denominated "ceramic" to manufacture a large number of objects.

The amount of calcium chloride to be added should be such that the amount of calcium sulfate formed is enough to cover the ore coarse particles, for these to be able to catch the concentrate finer particles, by generating a "flycatcher" effect.

Once the concentrate particles have been caught on the mineral particles, these are not mechanically released, not even with a high irrigation rate, as experimentally proved.

The second effect produced in this stage of this invention is the quick dissolution of the concentrate components containing copper. Since sulfuric acid is also added in this stage to contribute the sulfate ions required for gypsum to form, the sulfuric acid protons are also necessarily being added, which in turn combine with the oxygen in the oxides and other oxidized anions of the concentrate, to form water and release the copper cations, the same as in the normal curing operation and agglomeration of the oxidized ores.

In this case, however, the addition of calcium chloride produces a much more outstanding effect, especially with the copper concentrate containing copper sulphide species. The effect produced is similar to that of the acids on the copper oxidized ores, that is, a quick dissolution of the sulphide ores, but in this case, this works at the same time for the oxidized ores, and this clearly makes the difference between both processes, since in the normal curing stage of the oxidized ores, only the copper oxidized ores are dissolved, and practically none of the copper sulphides.

The cause of this phenomenon has been found after a long research and study period, which was partially described in the Chilean Patent already mentioned, and can be explained in the following simple manner:

First, the reaction generated to dissolve the sulphide ores can be commonly written as:

$$CuS + 2Fe^{+3} \rightarrow Cu^{+2} + S^0 + 2Fe^{+2} \quad (2)$$

or also:

$$CuFeS_2 + 4Fe^{+3} \rightarrow Cu^{+2} + 2S^0 + 5Fe^{+2} \quad (3)$$

These two reactions are the most important ones in the copper sulphide ore leaching, since they show that it is the oxidation of the sulfur as contained in the sulphides what allows the copper to release in the form of a cation.

In this case, the key of the phenomenon is the presence of the chlorine ion, which is contributed by the calcium chloride as is clearly shown in the equation (1) and, however, is not shown in the reactions (2) and (3).

In this stage, the chloride has two effects, very different from each other, but equally important. First, the chlorine atom generates a apparently cryptocrystalline structure of the sulfur produced by the reaction of the sulphides, reactions (2) and (3). Unlike what happens without chloride, for example in a sulfate environment, the chloride produces a reaction product layer that improves the transfer of the ferric ion, and the exit of the ferrous and the copper ions, which are the reaction products.

This phenomenon is well documented in various works as indicated in the literature, for example, in the references.

The second effect of the chloride ion is that of increasing the oxidation rate of the ferrous ion, to form a more ferric ion to oxidize the copper sulphides according with the reactions (2) and (3). This effect is interpreted as follows, which is also described on the Chilean Patent already mentioned.

First, in the presence of chloride, unlike that what happens in a sulfate environment, the cuprous ion can exist in equilibrium with the cupric ion due to the formation of chloride complex ions groups. As an example, we can mention the existence of three first cuprous chlorides, ranging from the lower to the higher grade of the complex ions:

$$Cu^+ + Cl^- \rightarrow CuCl_{(aq)} \quad (4)$$

$$Cu^+ + 2Cl^- \rightarrow CuCl_2^-{}_{(aq)} \quad (5)$$

$$Cu^+ + 3Cl^- \rightarrow CuCl_3^{-2}{}_{(aq)} \quad (6)$$

where the subindex (aq) means the compound is in the aqueous phase. These equations show that, the higher the concentration of chlorine in the solution, the higher the level of the cuprous complex ion. Likewise, the first cupric chlorides can be described as:

$$Cu^{+2} + Cl^- \rightarrow CuCl^+{}_{(aq)} \quad (7)$$

$$Cu^{+2} + 2Cl^- \rightarrow CuCl_{2(aq)} \quad (8)$$

$$Cu^{+2} + 3Cl^- \rightarrow CuCl_3^-{}_{(aq)} \quad (9)$$

The equilibrium among these compounds can be written for each pair of compounds, for example between the two first ones with the lowest chlorine content, as follows:

$$CuCl_{(aq)} \leftrightarrow CuCl^+{}_{(aq)} + e^- \quad (10)$$

This is a half-cell reaction; another reaction, able to consume the electron formed through this reaction, that is, a reaction with an electron acceptor compound, is required. The most evident candidate is the atmospheric oxygen, entering into the solution, forming water, and using these two electrons:

$$2H^+ + \tfrac{1}{2}O_2 + 2e^- \rightarrow H_2O \quad (11)$$

By using this equation, the equilibrium between the cuprous chloride complex ion and the cupric chloride complex ion, should be written as:

$$2CuCl_{(aq)} + 2H^+ + \tfrac{1}{2}O_2 \rightarrow 2CuCl^+{}_{(aq)} + H_2O \quad (12)$$

In this reaction, the oxidation of a compound, the cuprous complex ion, takes place, giving rise to an oxidized compound, the complex cupric ion, and this oxidation can be used, in turn, to oxidize the copper sulphides, for example:

$$CuS + 2CuCl^+ \rightarrow 2CuCl_{(aq)} + Cu^{+2} + S^0 \quad (13)$$

In this equation, the cupric ion has been written in a monomeric way, because this is the way it is found in the sulfur. However, it is possible that this same ion is able to oxidize part of the sulphide sulfur and, therefore, less chloride-cupric complex ion is used to oxidize the sulphide. That is, the mechanism works according to the following reaction:

$$CuS + CuCl^+ \rightarrow CuCl_{(aq)} + Cu^+ + S^0 \quad (14)$$

This gives rise to the formation of the cuprous ion, rather than the cupric ion, like in the reaction above. Even though the previous reactions are thermodynamically feasible, in the presence of iron in the solution, the most likely reaction for the sulphide leaching involves the ferric ion. There are two strong reasons to state this: first, the oxidation potential of the electrochemical couple: ferric-ferrous is higher than the: cupric-cuprous couple. Second, the ferric ion is a smaller and more active ion than the groups containing the cupric complex ion, so, the electron acceptor is likely to be the ferric ion, according to the following reaction:

$$2Fe^{+3} + 2e^- \rightarrow 2Fe^{+2} \quad (15)$$

With this, the equilibrium between the cuprous complex ion and the cupric complex ion can be written as:

$$2CuCl^+{}_{(aq)} + 2Fe^{+2} \leftrightarrow 2CuCl_{(aq)} + 2Fe^{+3} \quad (16)$$

Here, the cupric ion has been reduced to cuprous, and the ferrous ion has oxidized to ferric, and this latter reacts with the copper sulphides according to the reactions (2) and (3), as set forth above.

According to all that stated, the system that has two electrochemical couples, that is, the chloride-cupric/chloride-cuprous, and the ferric/ferrous couple works as follows:

The chloride-cuprous complex ion reacts with the atmospheric oxygen according to reaction (12) to form chloride-cupric complex ion.

The chloride-cupric complex ion reacts with the ferrous ion according to the equilibrium reaction (16) to form the ferric ion, also forming the chloride-cuprous complex ion as product of the reaction, which oxidizes back with the atmospheric oxygen according to reaction (12).

The ferric ion generated in the previous reaction attacks the copper sulphides, according to reactions (2) and (3), releasing the copper ions contained in them, towards the solution.

In this reaction, the ferric ion is reduced to ferrous ion. This ferrous ion oxidizes back, according to the equilibrium (16).

This mechanism corresponds to a self-catalytic reaction, since the reagents necessary for the final mechanism are internally generated in the same reaction system.

These same reactions take place with the more complex forms of cuprous and cupric ions, but the result is the same, that is, the oxidation of the ferrous ion to ferric ion as catalyzed by the cupric ion, resulting in the cuprous ion, which easily oxidizes with the air.

Obviously, the execution of the process described in this invention is independent of the chemical mechanism that actually takes place, and the above represents the best vision of the authors with the sole purpose of physically and chemically explaining the unusual phenomenon.

From a practical point of view, the industrial process as produced by the chemical reactions previously described can be described through two characteristics:

A stony material, formed by an ore, gravel, barren, or other material of similar characteristics, with a typical size range of less than ¾" of diameter, surrounded by fine material of a size typically smaller than Tyler 100 mesh, where both materials are adhered by calcium sulfate, as natural adhesive.

A thin layer of liquid surrounding the previous adhered particles, containing a great amount of copper and iron in solution in all its valence status, in addition to a high content of chloride ion.

This process is called "agglutination"

When this material is irrigated in the traditional way of the stockpile leaching, all the copper produced in the agglutination stage is assimilated by the irrigating solution, thus producing a high copper recovery at the beginning of the leaching.

Also, after this strong attack by the sulfuric acid along with the chloride ion being added, all the material, both that used as base and that adhered to the stony particles, has become susceptible to a higher reaction, following the same reactions previously described during the leaching stage, approximately, that is, while the solid mixture is irrigated with a high concentration solution of copper, chloride, iron, and acid, which are the reagents required by the leaching reactions.

For the process to work as described above, the coexistence of all the species already mentioned is enough, that is, a base material, a fine material containing copper, the calcium chloride salt in aqueous solution, and sulfuric acid in any of its commercial forms. The proportions to be used among these components will depend on the physical characteristics of the two solid materials, and on the results expected, and will not be restricted by the characteristics of the process.

The criterion to add the sulfuric acid is the same currently used for the oxidized copper ores. This is generally based on experimental tests, and the final result depends on each ore, or in this case, of each concentrate. A typical criterion consists of adding, in this stage, 80% of the acid which will be consumed by the gangue, plus the acid that will be consumed by the copper in the agglomeration or curing stage. For example, an ore containing 1.5% of copper, where the recovery in the curing is assumed to be of 30%, it requires 7 Kg/ton of acid because of the copper. If furthermore, this ore shows an acid consumption of 30 Kg/ton of gangue consumption, then, the amount of acid to be added in this stage should be about 31 Kg/ton of acid.

The amount of acid added to the curing stage limits the amount of $CaCl_2$ that can be added. In fact, if the amount of acid is 31 Kg/ton, then there exists, as a maximum, 30 Kg/ton of sulfate ion available to form $CaSO_4 \ast 2H_2O$. Therefore, according to reaction (1), the amount of $CaCl_2$ likely to be added is 35 Kg/ton. If a larger amount is added, a part of the $CaCl_2$ will not react, and its role will be useless.

This value represents the maximum amount of $CaCl_2$ to be added to the ore, which is a function of the amount of acid added in the curing stage. On the other hand, the minimum amount of $CaCl_2$ to be added is a function of the surface of the particles of the material used as a base, which are able to form growth cores with the fine particles. For example, if a typical distribution of an ore under ⅜" is used, and the particles able to form cores are supposed to be those larger than 2 mm, then the specific surface of these core-forming particles will be in the neighborhood of 2.7 $[cm^2/g]$ of ore.

Another criterion for the amount of calcium chloride to be added could be the following: For the calcium sulfate to exert its "flycatcher" effect already described, this should completely surround the particles of the base material which generates nucleation. For this effect to be as expected, it can be assumed that the calcium sulfate layer should be able to retain half of the largest volume of a concentrate particle. If the largest particle of concentrate is 100 microns, then the sulfate layer should be, as a minimum, 0.005 cm. thick. Given this value, the gypsum volume required for this distribution of base material particles should be 0.0135 $[cm^3/g]$. Assuming a density of 2.0 $[g/cm^3]$ for the hydrated gypsum, this means that 0.027 g of gypsum per gram of ore is needed to obtain the effect desired. Using the proportion of gypsum formed regarding the calcium chloride added, according to reaction (1), an amount of 17.4 Kg of $CaCl_2$ per ton of ore is obtained.

These values are given only as an example of how to calculate the amounts of sulfuric acid and calcium chloride to be used in each case, not as a limitation to our invention. Cases more complex than this may exist, which should be specially analyzed. The amounts of sulfuric acid and calcium chloride to be added will depend on each case, and should be experimentally studied.

Also, our calculations show that this process is valid to try any materials containing copper, regardless if it has its origin in an oxidized, pure material, or a sulphide. The rationale of the process is the following: the calcium sulfate as formed, due to the calcium chloride added, is more than enough for the material formed by this method to be able to form a leaching heap.

Numeric values of the typical amounts of the different components used up to this moment are shown below, in the application example section.

Preferred Realization of the Invention

The preferred realization of this invention consists in mixing the base material, which will usually be smaller than ¾", preferably under ½" and, even better, less than ⅜", with a fine material that will usually be smaller than Tyler 100 mesh, and will be the one containing the valuable copper species, specifically copper sulphide compounds. It is not limited to the latter, since oxidized species can also exist, easily soluble or refractory, and also pure copper or slightly oxidized, in which case the calcium chloride also serves to adhere these particles to the base material.

The mixture of these two solid materials along with sulfuric acid and the calcium chloride solution, or solid calcium chloride dissolved in water, takes place preferably into a rotatory drum to form the agglutinated material, which is arranged in heaps, in the traditional way, at the current hydrometallurgical plants.

APPLICATION OF EXAMPLES

A high number of experiences using the concept previously described have been realized, both in industrial size heaps and columns, as well as with different materials, both for the base material, that is, ore or barren material, and the fine material adhered to said base. Next, the more significant examples, at our judgment, of these experimental tests, are shown.

Example No. 1

In this example, two semi-industrial heaps, 1,000 tons each, were formed, mixing a low grade ore from the ore body Estefania of Minera Michilla, with the following chemical characteristics, was mixed: total Cu: 0.52%; soluble Cu: 0.30%, and an acid consumption per laboratory test of 90 Kg/ton, this ore was used as base material. It was mixed with a concentrate, in two different proportions, in a stockpile with 6.9%, and the other one with 10.1%. This concentrate had the following characteristics: total Cu=26.10%; soluble Cu=7.27%, and an acid consumption at the laboratory of 150 Kg/ton. According to the mineralogical analysis, the sulphide part of this concentrate is mainly composed of calcosine, around 85%, and the rest is composed of coveline, bornite, and in lower degree of chalcopyrite. The particles size distribution, with its respective copper grade, of the concentrate and the ore, were the following:

| CONCENTRATE PARTICLES SIZE DISTRIBUTION | | | | | |
| --- | --- | --- | --- | --- | --- |
| Mesh | % Partial | % Accumulated | % CuT [%] | % CuS [%] | % CuI [%] |
| 65# | 0.0 | 0.0 | | | |
| 100# | 47.6 | 47.6 | 19.71 | 5.78 | 13.93 |
| 200# | 12.2 | 59.8 | 33.80 | 5.93 | 27.86 |
| −200# | 40.2 | 100.0 | 31.35 | 9.43 | 21.92 |
| Total | 100.0 | | 26.10 | 7.27 | 18.84 |

| ORE PARTICLES SIZE DISTRIBUTION | | | | | |
| --- | --- | --- | --- | --- | --- |
| Mesh | % Partial | % Accumulated | % CuT [%] | % CuS [%] | % CuI [%] |
| ⅜" | 0.0 | 0.0 | | | |
| ¼" | 17.1 | 17.1 | 0.28 | 0.21 | 0.07 |
| 50# | 76.8 | 93.9 | 0.54 | 0.28 | 0.25 |
| 100# | 1.8 | 95.7 | 0.91 | 0.59 | 0.32 |
| 200# | 1.1 | 96.8 | 0.95 | 0.70 | 0.24 |
| −200# | 3.2 | 100.0 | 1.02 | 0.91 | 0.11 |
| Total | 100.0 | | 0.52 | 0.30 | 0.22 |

The ore was fed, along with the concentrate, to an industrial rotatory drum at a mass rate of 320 ton/hr. At the same time, along with the ore and the concentrate, sulfuric acid was added through a pipe at a rate of 30 Kg/ton of ore. In the normal operation of this industrial rotatory drum, normally at the plant, sea water is also used at a rate of 60 lt/ton of ore. In this case, water was totally replaced for a sea water and calcium chloride solution, which is soluble in water, at a concentration of 200 g/lt of calcium chloride used in this study. The amount of the solution used in this case was 84 lt/ton of ore, higher than the normal amount of water used due to the water consumption of the reactions of this process, as explained above.

To supply the concentrate, a side belt that fed 90° above the ore main belt was used, which discharged directly into the rotatory drum, as shown in FIG. 1. In general, the process was similar to what is usually carried out in the normal ore agglomeration work site, being the addition of the calcium chloride solution rather than sea water, as in the usual practice, the only significant difference.

Two heaps, each being about 1,000 tons, were loaded with the material from the agglomeration drum. The heaps began being irrigated with a solution that contained an average of 84 g/lt of chloride and 7 g/lt of copper, approximately. During the whole leaching period, the solution flow that entered into the heaps was measured, and each certain number of days, usually three, the concentrations of a composite at the entrance and exit of the piles were measured. After some time, around 110 days, the heaps were discharged and the leached gravel was analyzed for total copper and soluble copper. This allowed to calculate the recoveries per head-tail of both stockpiles.

Figure 4A:
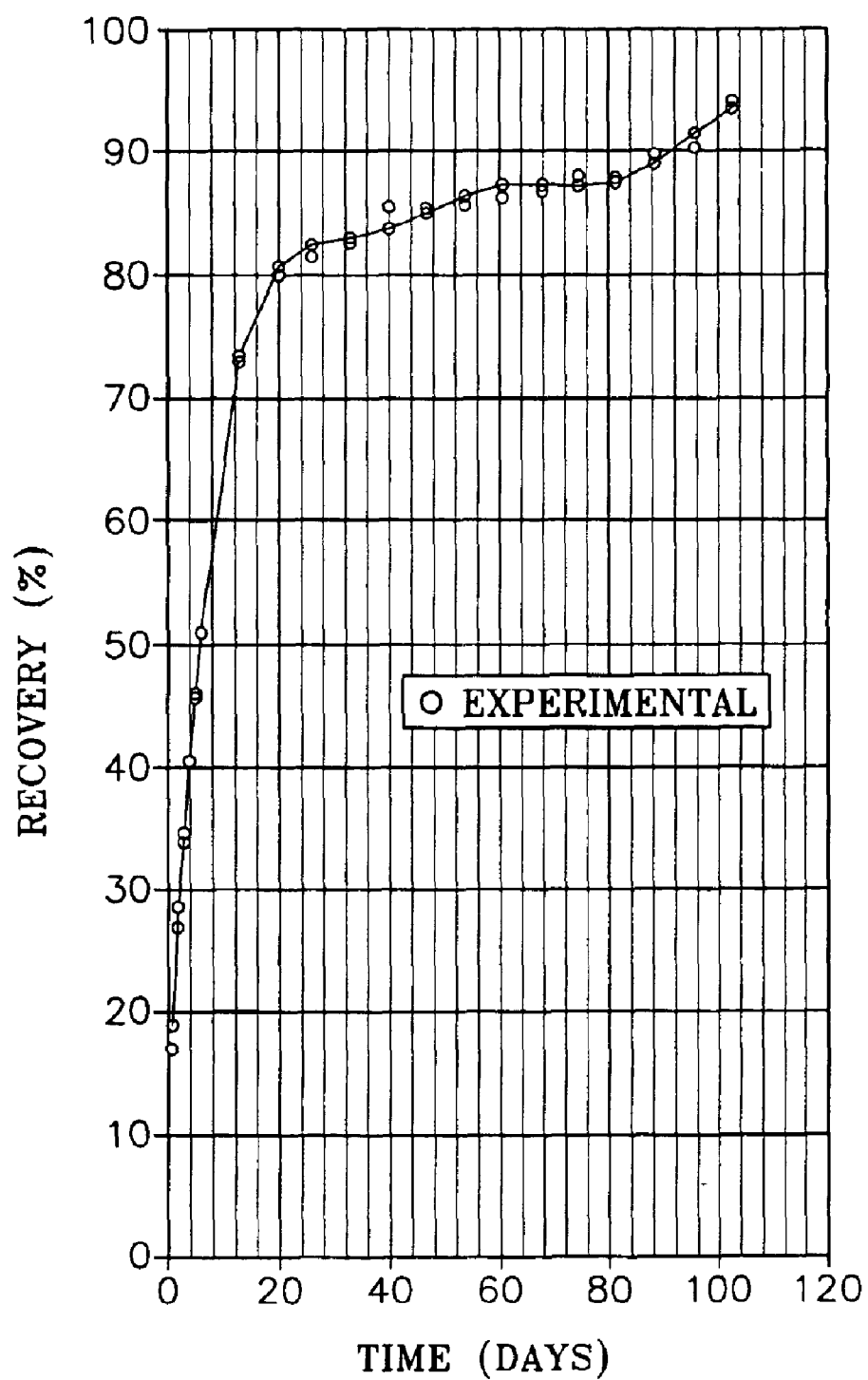
FIG. 4 is a graph showing the recoveries as obtained for both heaps, which turned out to be of 93.7% in both cases.
Figure 4B:
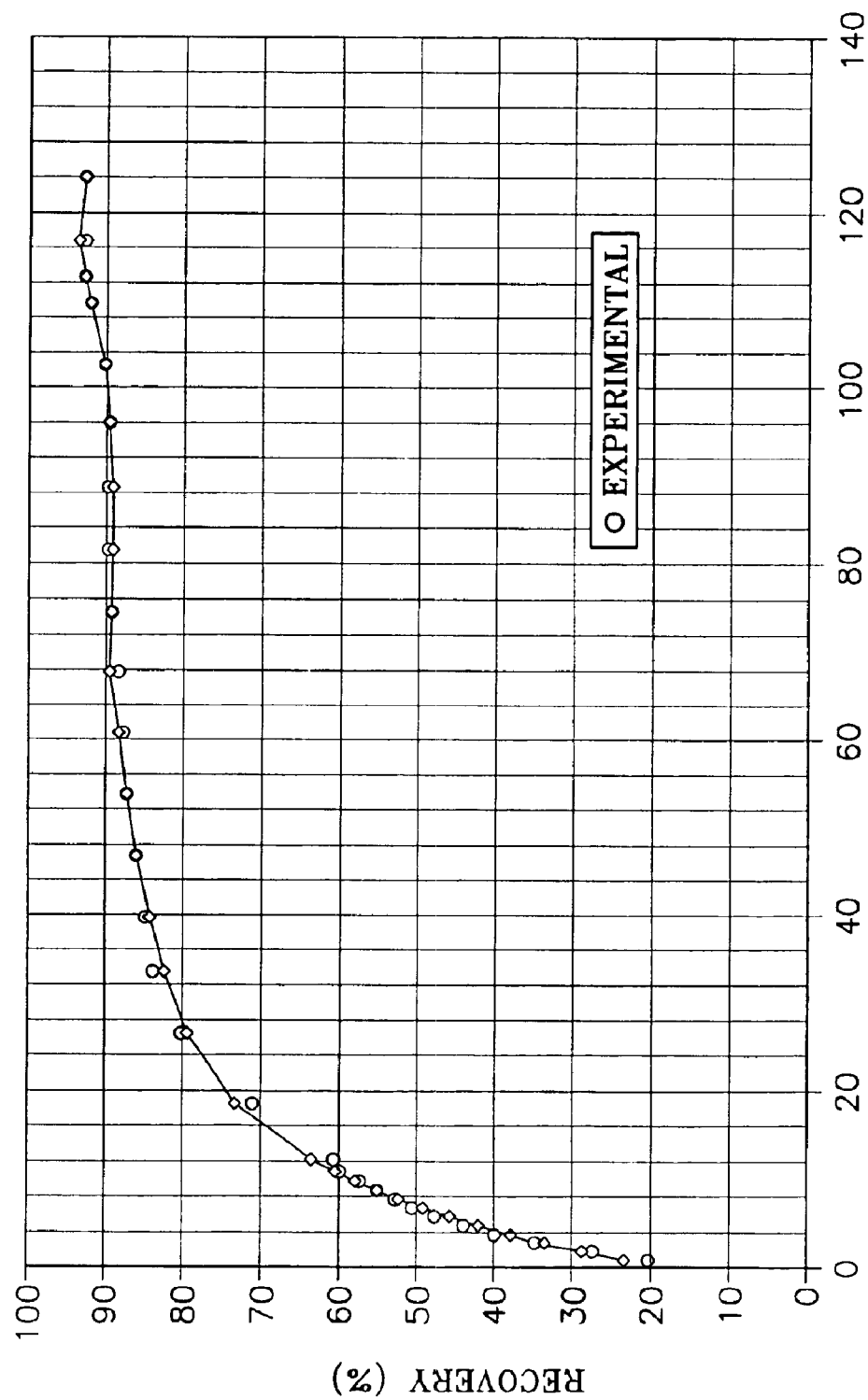

FIG. 4 shows the recoveries obtained for both piles, which turned out to be 93.7% in both cases, value obtained from the head-gravel grades at both piles. The head grades were: 2.17 and 3.00% of total Cu respectively, and the corresponding leached gravels: 0.136% and 0.187% of total Cu.

The value for the recovery as indicated above, corresponds to the recovery of the mixture of the low grade ore with the concentrate. Here, it is not possible to know in advance which recovery corresponds to the ore, and which one corresponds to the concentrate, since we do not know which part of the copper in the residual gravel corresponds to the ore, and which one corresponds to the concentrate. The only thing to do is an estimation of the recoveries of both components of the mixture, as shown below.

First, if the gravel grade is assumed to be the same for both materials, then the recovery obtained for the ore being 73.9%, and 99.5% for the concentrate. This value seems to be very optimistic, in spite of the recovery of the ore is quite suitable for its head grade. However, on the other hand, if the smallest size part of the gravels, that is, that under the mesh 65# is assumed to fully correspond to the concentrate, then the new results are: the recoveries obtained for the ore amount to 83.3 and 80.0% for each of the piles, and 96.8 and 96.7% of total copper in the concentrate for each of the piles.

The real result for the recovery of total copper in the concentrate has to be between these two values, that is, between 96.8 and 99.5%.

In both cases, the recoveries obtained are comparable to the recovery obtained in a pyrometallurgical process.

Example No. 2

To show that this process is also applicable to other copper species, not only those of the chalcocite type as seen in the previous example, other experience was realized with concentrate from the flotation of copper slag smelting. This new concentrate had the following global characteristics: Chemical composition: 31.28% of Total Cu, 3.30% of Soluble Cu; 23.4% of Total Fe, and 8.11%, of Soluble Fe, and a laboratory acid consumption of 9.0 Kg of acid per Kg of Soluble Cu. The particle size analysis gave the following values:

| Mesh | Mass % | Mass % | % CuT [%] | % CuS [%] | % CuI [%] |
|---|---|---|---|---|---|
| 65# | 1.01 | 1.01 | 27.09 | 7.52 | 19.57 |
| 100# | 2.15 | 3.16 | 31.44 | 4.30 | 27.14 |
| 200# | 12.44 | 15.6 | 33.59 | 2.86 | 30.73 |
| −200# | 84.40 | 100.0 | 31.14 | 3.01 | 28.13 |
| Total | 100.0 | | 31.41 | 3.06 | 28.35 |

The mineralogical analysis, on the other hand, recognized the presence of the following species: Chalcopyrite: 60%, Chalcocite 24.1%, Coveline: 1.6%, Bornite: 5.2% with some pyrite (6.7%) and pyrrhotite (<2%). It is also interesting to state that the X-Ray analysis of this sample indicates that much of the copper sulphides are amorphous, that is, non crystalline, and the rest in the form of chalcopyrite.

This concentrate was mixed in the proportion of 11.0%, on wet base, with an ore that had the following grain size distribution:

| Mesh | % Partial | % Accumulated | % CuT [%] | % CuS [%] | % CuI [%] |
|---|---|---|---|---|---|
| ⅜" | 0.0 | 0.0 | | | |
| ¼" | 28.31 | 28.31 | 0.5 | 0.11 | 0.39 |
| 50# | 61.20 | 89.51 | 1.21 | 0.19 | 1.02 |
| 100# | 1.33 | 90.84 | 1.68 | 0.42 | 1.26 |
| 200# | 0.61 | 91.45 | 1.82 | 0.49 | 1.33 |
| −200# | 8.55 | 100.00 | 2.55 | 0.8 | 1.75 |
| Total | 100.00 | | 1.13 | 0.22 | 0.91 |

The mixture took place in a homogenizer drum before the agglutination. The head grade of the mixture at the end of this process turned out to be: 3.901% of total Cu, 0.503% of soluble Cu, and 3.397% of insoluble Cu. The mixture was made by adding 15.0 Kg/ton of calcium chloride in an aqueous solution of 150 g/l of chlorine. The amount of industrial sulfuric acid added was of 30 Kg/ton. Finally, sea water enough to reach a total of 100 Kg/ton of humidity was added.

With the material agglomerated in this way, a column of 3 m height, and 19 cm diameter, was loaded. Two days later, the column began being irrigated at a rate of 20 lt/m² hr, with a solution that had, as its main components, the following: Cu: 4.7 g/lt, Total Fe: 11.8 g/lt, Fe+²: 8.3 g/lt, acid: 7.3 g/lt y Cl: 95 g/lt. At the end of the leaching period, this solution was changed with another that contained only 0.7 g/lt of copper for the purpose of eliminating, by washing, the copper that remained soaking in the agglomerate at the end of the leaching.

Figure 5A:
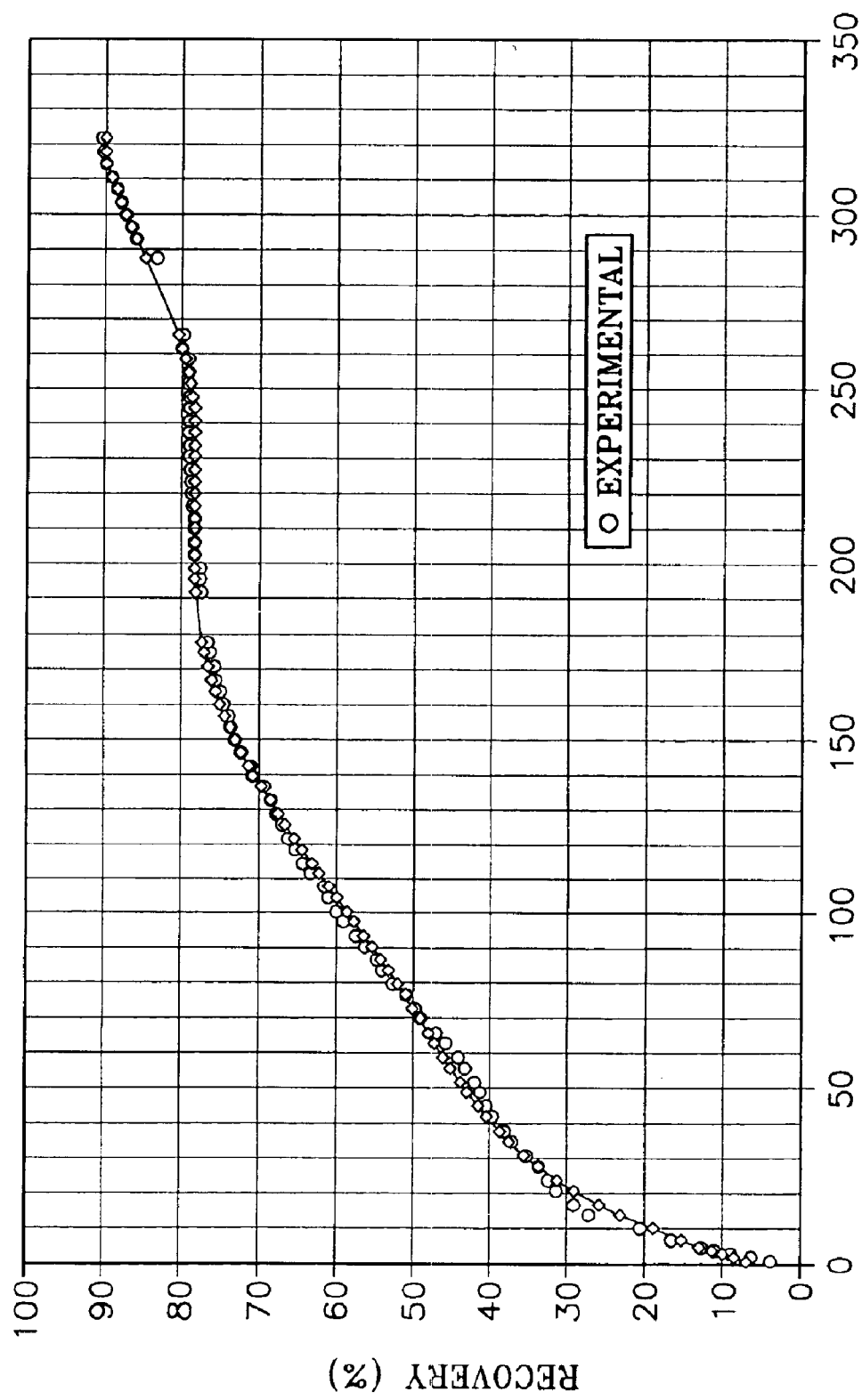
FIG. 5 is a graph showing the recovery curve obtained (a) for example (2) and (b) for example (3), where the final recoveries of 90.2% and 85.5%, respectively, can be appreciated. The evident increase of the recovery at the final part of the curve is due to the washing effect already mentioned.
Figure 5B:
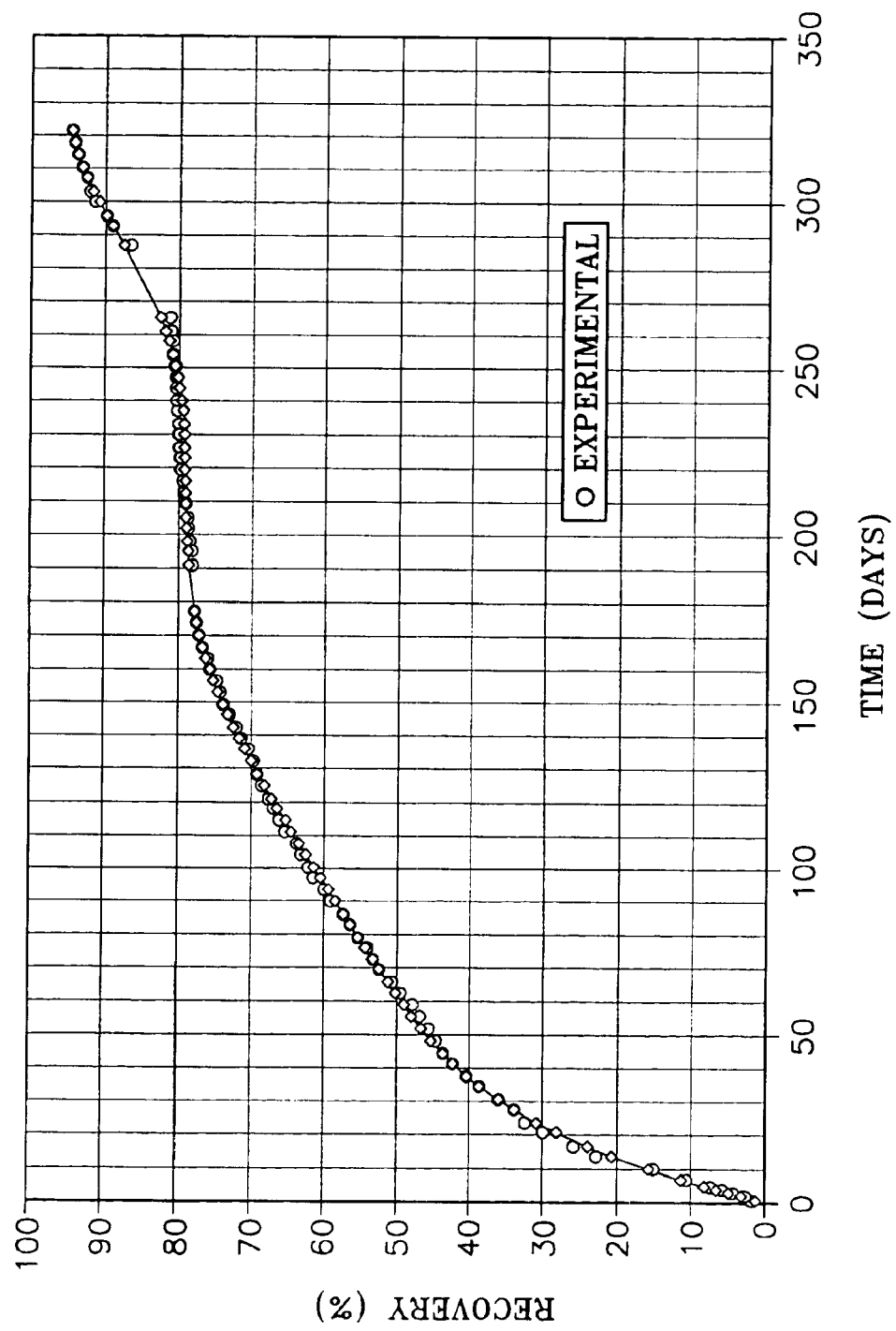

FIG. 5 shows the recovery curve obtained, where the final recovery of 90.2%, which corresponds to a gravel grade of 0.383% of Total Copper, can be seen. The evident increase of the recovery at the final part of the curve is due to the effect of the washing already mentioned.

Again, there is a problem to estimate the recovery of each of the materials involved, since there is only one gravel grade. Like the previous case, the tail grade can be assumed to be the same for the material and for the concentrate, with which a 98.8% recovery is obtained for the concentrate, and 66.4% for the ore. However, this calculation gives a too optimistic value. A more pessimistic exercise can be done, by considering that all of the gravels under the mesh —100# correspond to concentrate. The recoveries obtained, in this case, are: 91% for the concentrate, and 80% for the ore.

The process described hereby is proven to be industrially applicable to the material of the characteristics described, that is, material from flotation of copper slag melting. Again, the only role of the ore used is keeping, helped by the calcium chloride, the concentrate particles from being swept by the irrigation solution. If an inert material, without copper, is used rather than ore, the role played is the same, with the additional advantage of solving the issue of the recovery assignment, since that of this material would be zero.

Example No. 3

Finally, an example for the copper material more difficult to leach, corresponding to a concentrate mainly composed of chalcopyrite, is included. With this example, the process described hereby is proven to be worthy for all the types of copper sulphide concentrates.

The chalcopyrite concentrate used had the following characteristics: Global chemical composition: 45.36% of Total Cu, 2.80% of Soluble Cu; 16.5% of Total Fe, 0.8% of Soluble Fe, and a laboratory acid consumption of 16.0 Kg of acid per Kg of Soluble Cu.

The grain size analysis gave the following values:

| Mesh | Mass % | Mass % Accu | % CuT [%] | % CuS [%] | % CuI [%] |
|---|---|---|---|---|---|
| 65# | 0.00 | 0.00 | | | |
| 100# | 1.18 | 1.18 | 36.06 | 2.80 | 33.26 |
| 200# | 15.14 | 16.32 | 40.15 | 1.80 | 38.35 |
| −200# | 83.68 | 100.0 | 46.91 | 1.60 | 45.31 |
| Total | 100.0 | | 45.76 | 1.64 | 44.12 |

On the other hand, the mineralogical analysis showed the presence of the following species: Chalcopyrite: 65.2%, Digenite: 25.1%, Coveline: 7.7%, bornite: 2.0%, and some pyrite (2.6%). It is also interesting to stress the fact that the X-Ray analysis of this sample showed that a large part of the sulphides correspond to chalcopyrite. Previous results show that the non-chalcopyrite copper content reaches 56.4%. So, any recoveries obtained above this value means that a part of the chalcopyrite has been leached.

The chalcopyrite concentrate was mixed in 11.0% proportion, on wet base, with an ore having the following particle size distribution:

| Mesh | % Partial | % Accumulated | % CuT [%] | % CuS [%] | % CuI [%] |
|---|---|---|---|---|---|
| -3/8" | 0.0 | 0.0 | | | |
| -1/4" | 22.6 | 22.6 | 0.69 | 0.16 | 0.53 |
| 50# | 69.5 | 92.1 | 1.22 | 0.18 | 1.04 |
| 100# | 2.4 | 94.5 | 1.68 | 0.32 | 1.36 |
| 200# | 0.9 | 95.4 | 1.83 | 0.47 | 1.36 |
| -200# | 4.6 | 100.00 | 1.95 | 0.47 | 1.48 |
| Total | 100.00 | | 1.15 | 0.19 | 0.96 |

Like in the previous example, the mixture took place into an homogenizer drum before the agglutination. The grade of the resulting product was 5.2% of total Cu. Agglutination was obtained by adding 15.0 Kg/ton of calcium chloride in an aqueous solution of 237 g/lt of calcium chloride. The amount of industrial sulfuric acid added was 30 Kg/ton, and finally, sea water enough to reach a total humidity of 100 kg/ton of water was added.

With the material agglutinated in this way, a column of 2.5 m height, and 19 cm diameter was loaded. Two days later, the column began being irrigated at a rate of 20 lt/m$^2$ hr with a solution containing, as the most important components, the following: Cu: 4.7 g/lt, Total Fe: 11.8 g/lt, ferrous iron: 8.3 g/lt, acid: 7.3 g/lt and Cl: 95 g/lt. At the end of the leaching period, this solution was replaced with another one containing only 0.7 g/lt of copper to wash away the copper that remained soaking in the agglomerate at the end of the leaching. Washing continued for 28 days.

FIG. 5 shows the recovery curve obtained, where a final recovery of 85.5% can be seen, for a gravel grade of 0.76% of total Cu. The evident increase of the recovery at the final part of the curve is due to the wash effects, as mentioned above.

Again, there is a problem to estimate the recovery of each of the materials involved, since there is only one gravel grade. Like in the previous case, the gravel grade can be supposed to the same for the ore and the concentrate. In this case, a recovery of 29.0% for the ore, and 98.3% for the concentrate is obtained, but this calculation gives a too optimistic value. A more pessimistic supposition can be made, by assuming that all the gravels under mesh —100# belong to the concentrate. In this case, the recoveries obtained are: 78.9% for the concentrate, and 64.8% for the ore.

This example shows that the process is also industrially applicable to concentrates of chalcopyrite ores. Again, the only role of the ore used is keeping, helped by the calcium chloride, the concentrate particles from being swept away by the irrigating solution. If an inert material, without copper, is used, its role is the same, with the additional advantage of solving the problem helped by the calcium chloride, the concentrate particles from being swept away by the irrigating solution. If an inert material, without copper, is used, its role is the same, with the additional advantage of solving the problem of recovery assignment, since that of this ore would be zero.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

We claim:

1. A procedure to leach copper flotation concentrates in a heap, comprising the steps of:
    artificially adhering the concentrate to the surface of a solid material, wherein said solid material is selected from the group of materials consisting of a rocky material and a plastic material, to form a chemically adhered agglomerated material;
    stockpiling the chemically adhered agglomerated material to form a leaching heap; and
    leaching the heap with a solution containing at least Cl, Cu, and Fe ions.

2. The procedure according to claim 1, further comprising the steps of: simultaneously mixing of
    the rocky material having a size typically less than 3/4 inch with a copper concentrate in a weight fraction up to 20% to form a mixture of rocky material and copper concentrate;
    adding a calcium chloride solution containing 22 to 250 grams of chloride per liter of solution to the mixture of rocky material and copper concentrate in a proportion of 5 to 250 kilos of calcium chloride per ton of concentrate; and
    adding a second solution containing sulfate ions to the mixture of rocky material and copper concentrate in a proportion of 5 to 70 kilos of sulfate per ton of mixture;
    wherein the final mixture has a moisture content between 35 to 130 kilos per ton of rocky material in dry basis.

3. The procedure according to claim 2 wherein the rocky material size is no greater than 1/2 inch.

4. The procedure according to claim 2 wherein the rocky material size is no greater than 3/8 inch.

5. The procedure according to claim 2 and further including the step of adding a water flow to the mixture in order to get a moisture content between 35 to 130 kilos per ton of mixture.

6. The procedure according to claim 2, wherein calcium chloride solution is prepared with a water selected from the group consisting of pure water, industrial water, treated sewage water, sea water and saline water.

7. The procedure according to claim 2, wherein the second solution containing sulfate ions is sulfuric acid, with a concentration in weight ranging from 14 to 98%.

8. The procedure according to claim 1, wherein said rocky material is selected from the group consisting of an ore, a barren mining rock a discarded ore and a leached ore.

9. The procedure according to claim 2, wherein the concentrate is replaced by a material selected from the group consisting of a copper tailing, a copper precipitate and any other dusty material containing copper values.

10. The procedure according to claim 2, wherein the concentrate comprises copper in the form at least one compound selected from the group consisting of chalcocite, coveline, covellite, bornite and chalcopyrite.

11. The procedure to leach copper concentrates on a non-flooded heap, according to claim 2, and further including the steps of:
    letting the heap rest for a period ranging from 15 to 90 days;
    leaching the heap during a leaching stage by a leaching solution, at a flow rate of 5 to 100 lt/m$^2$hr for a period ranging from 50 to 300 days; and
    once the leaching stage has finished, washing the heap with a washing solution at a flow rate of 5 to 100 lt/m$^2$hr for a period ranging from 1 to 30 days.

12. The procedure to leach copper concentrates, agglomerated according to claim 2, on a non-flooded heap according to claim 11, wherein the leaching solution contains between 0.5 and 10 g/lt of copper, between 50 and 120 g/lt of chloride, and 5 to 25 g/lt of equivalent sulfuric concentration.

13. The procedure according to claim 11, wherein the leaching solution is formed from a mixture of pregnant and raffinate solutions of the process.

14. The procedure according to claim 11, wherein the calcium chloride added in the agglomeration stage contributes part or all of the chlorine of the leaching solution.

15. The procedure according to claim 11, wherein the washing solution is raffinate solution.

16. The procedure according to claim 15, wherein the raffinate solution contains between 0 and 1 g/lt of copper, between 60 and 130 g/lt of chloride, and 10 to 40 g/lt of equivalent sulfuric acid concentration.

17. The procedure according to claim 1, wherein the plastic material are a polyethylene sphere packing.

* * * * *